(12) United States Patent
Romano et al.

(10) Patent No.: US 10,698,869 B2
(45) Date of Patent: Jun. 30, 2020

(54) SYSTEM AND METHOD FOR DATA STRUCTURE MIGRATION CONTROL

(71) Applicant: BANK OF AMERICA CORPORATION, Charlotte, NC (US)

(72) Inventors: Brad E. Romano, Furlong, PA (US); Shashi Thanikella, North Brunswick, NJ (US)

(73) Assignee: Bank of America Corporation, Charlotte, NC (US)

( * ) Notice: Subject to any disclaimer, the term of this patent is extended or adjusted under 35 U.S.C. 154(b) by 242 days.

(21) Appl. No.: 15/277,541

(22) Filed: Sep. 27, 2016

(65) Prior Publication Data

US 2018/0089185 A1    Mar. 29, 2018

(51) Int. Cl.
   *G06F 16/30*       (2019.01)
   *G06F 16/21*       (2019.01)
   *G06F 16/25*       (2019.01)
   *G06F 16/22*       (2019.01)

(52) U.S. Cl.
   CPC ........ *G06F 16/214* (2019.01); *G06F 16/2272* (2019.01); *G06F 16/258* (2019.01)

(58) Field of Classification Search
   CPC ... G06F 16/40; G06F 16/24575; G06F 16/434
   USPC ........ 707/609, 687, 705, 769, 790, 813, 821
   See application file for complete search history.

(56) References Cited

U.S. PATENT DOCUMENTS

| | | | |
|---|---|---|---|
| 7,240,174 B2 | 7/2007 | Shaw et al. | |
| 8,713,307 B2 | 4/2014 | Nakagawa et al. | |
| 8,856,191 B2 | 10/2014 | Ben-tsion | |
| 9,021,481 B2 | 4/2015 | Yamazaki | |
| 9,274,949 B2 | 3/2016 | Dow | |
| 9,892,206 B2* | 2/2018 | Levy | G06F 21/10 |
| 2004/0117358 A1* | 6/2004 | von Kaenel | G06Q 40/08 |
| 2007/0083762 A1* | 4/2007 | Martinez | G06F 16/434 |
| | | | 713/176 |
| 2008/0071725 A1* | 3/2008 | Raskin | G06F 16/40 |
| 2008/0244226 A1 | 10/2008 | Li et al. | |
| 2012/0311438 A1* | 12/2012 | Cranfill | G06F 3/0483 |
| | | | 715/256 |
| 2016/0099998 A1 | 4/2016 | Richman et al. | |

(Continued)

OTHER PUBLICATIONS

NPL search.*

(Continued)

*Primary Examiner* — Sana A Al-Hashemi
(74) *Attorney, Agent, or Firm* — Michael A. Springs

(57) ABSTRACT

A data structure management system includes a first database, a second database, and a processing engine. The first database includes a first file with a first term and a corresponding first metadata, and a second file with the first term and a corresponding second metadata. The processing engine extracts the first file and the second file from the first database in a first format. It links the first term with the first metadata from the first file and the second metadata from the second file. It transforms the extracted first file and second file from the first format into a second format while maintaining the link between the first term, the first metadata, and the second metadata. It then exports the transformed first file and second file to a second database in the second format with the link between the first term, the first metadata, and the second metadata intact.

18 Claims, 3 Drawing Sheets

(56) References Cited

U.S. PATENT DOCUMENTS

2016/0170919 A1 6/2016 Blagodurov et al.
2016/0210327 A1* 7/2016 Li ..................... G06F 16/24575

OTHER PUBLICATIONS

U.S. Appl. No. 15/277,150, Romano, et al. entitled "Machine Learning Method and System for Predicting File Controls", filed Sep. 27, 2016.
U.S. Appl. No. 15/277,276, Romano, et al. entitled "System and Method for File Management in Data Structures", filed Sep. 27, 2016.
U.S. Appl. No. 15/277,418, Romano, et al, entitled "System and Method for Inter-Program File Control Communication", filed Sep. 27, 2016.

* cited by examiner

US 10,698,869 B2

SYSTEM AND METHOD FOR DATA STRUCTURE MIGRATION CONTROL

TECHNICAL FIELD OF THE INVENTION

This invention generally relates to data structure management, and more specifically relates to systems and methods for data structure migration control.

BACKGROUND OF THE INVENTION

As computer systems and networks have become more complex, management of data structures within these systems increasingly presents several technical challenges. Systems and methods for migration of metadata within data structures, for example, have proved inadequate in various respects. Accordingly, there is a need for robust data structure control systems and methods.

SUMMARY OF THE INVENTION

A data structure management system includes a first database, a second database, and a processing engine. The first database includes a first file with a first term and a corresponding first metadata, and a second file with the first term and a corresponding second metadata. The processing engine extracts the first file and the second file from the first database in a first format. It links the first term with the first metadata from the first file and the second metadata from the second file. It transforms the extracted first file and second file from the first format into a second format while maintaining the link between the first term, the first metadata, and the second metadata. It then exports the transformed first file and second file to a second database in the second format with the link between the first term, the first metadata, and the second metadata intact.

The present embodiment presents several technical advantages. For example, in the present embodiment data and metadata from several disparate sources in different formats are all transformed into one centralized format and stored at a central database. This allows computer systems to access the data from the central database without having to individually access each separate source and transform the data from that source into a usable format. Further, the present embodiment enables data and metadata stored in one central database to be transported to a second, master database that comprises data and metadata from sources including other databases. This centralization involves transforming data and metadata from a first database into a common format while retaining the relationships between the data and the metadata and storing the transformed data and metadata in a master database. This improves computer functionality of downstream computers because those computers no longer need to access multiple databases to access data from different sources and can also access the metadata for all such data at a central location. This conserves memory as well as processing resources while facilitating the migration of large amounts of data from repository to repository.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE INVENTION

Figure 1:
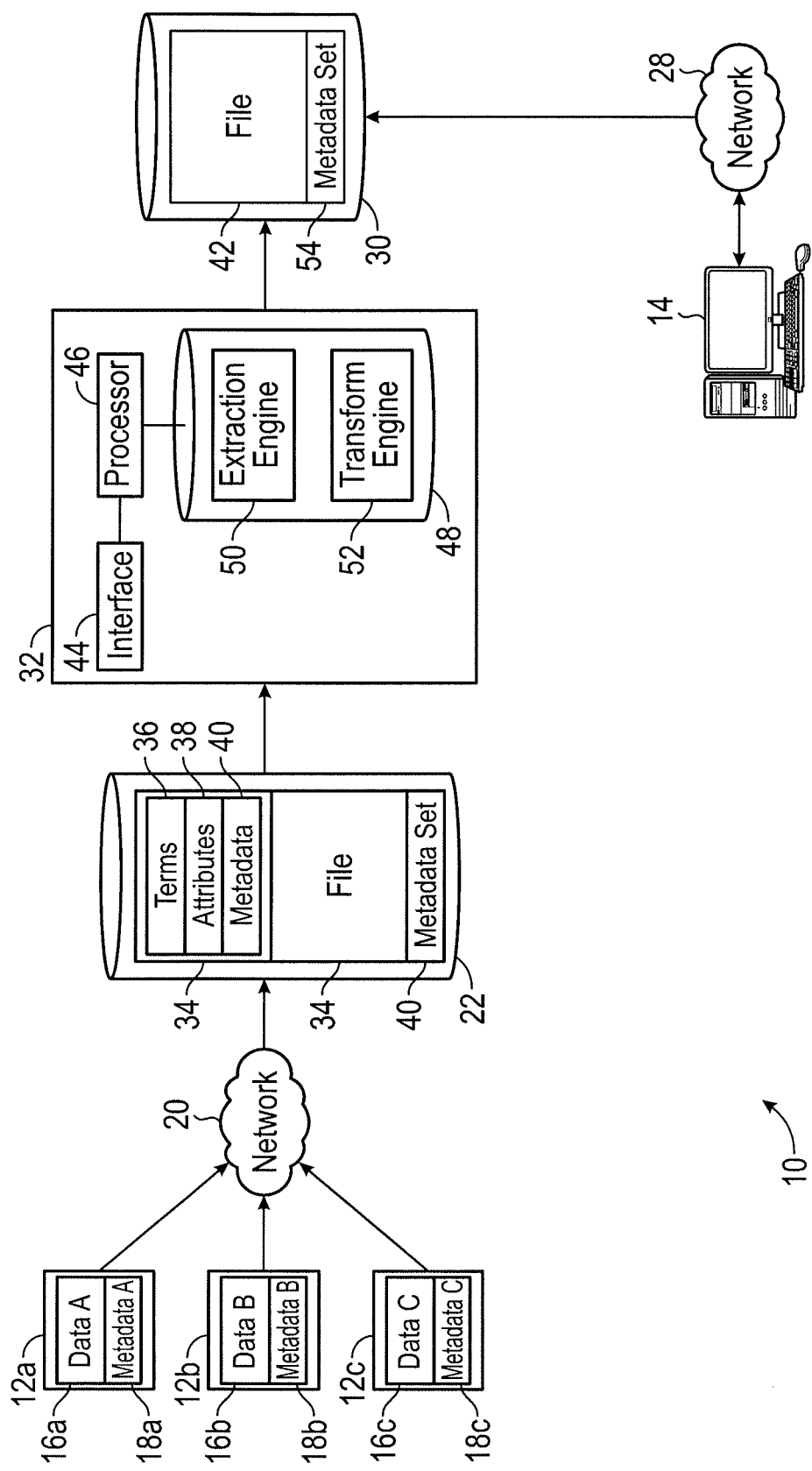
FIG. 1 illustrates one embodiment of an overall system for data structure migration control.
Figure 2:
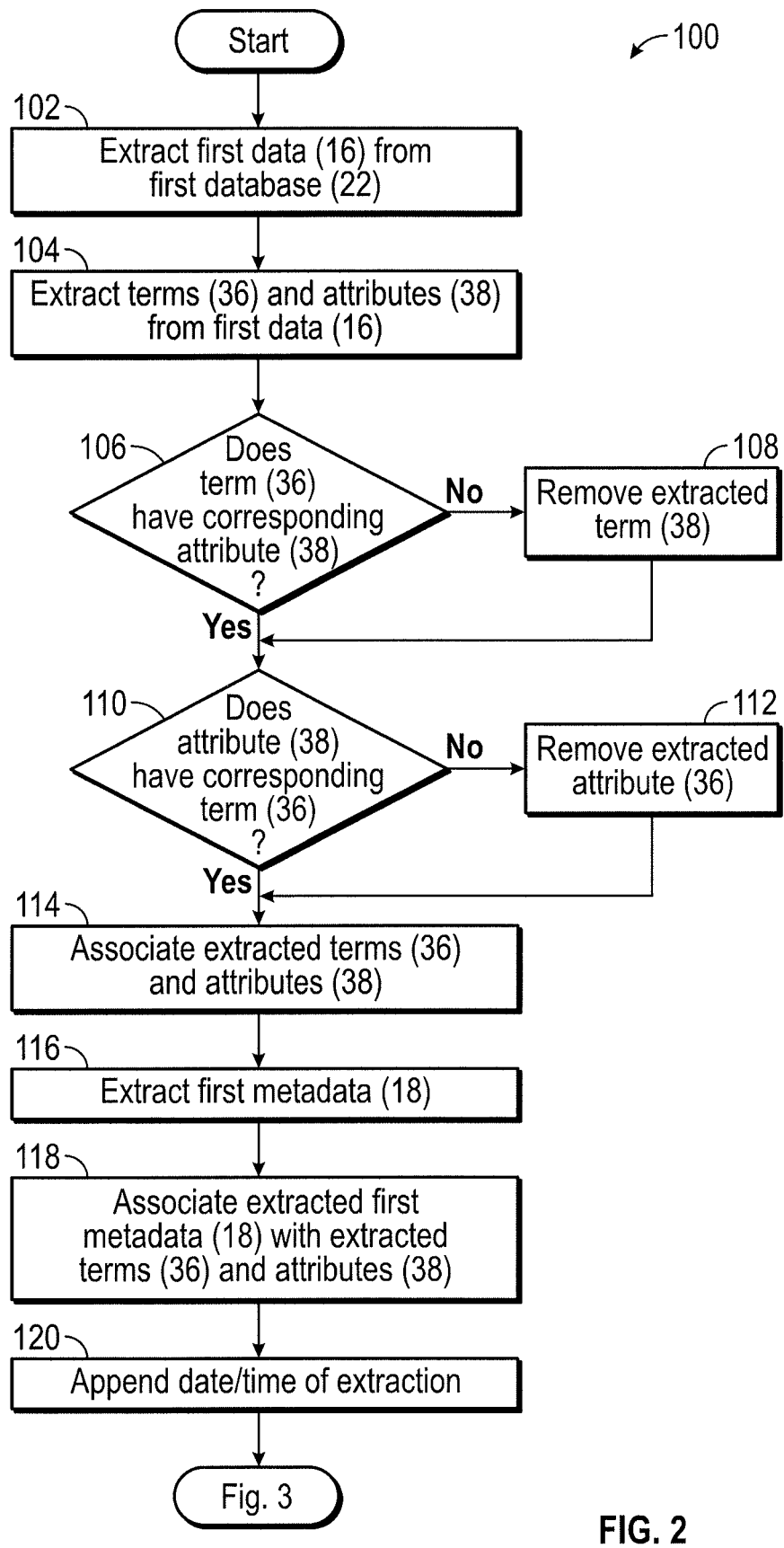
FIG. 2 illustrates a process executed by an extraction engine of the data structure migration control system.
Figure 3:
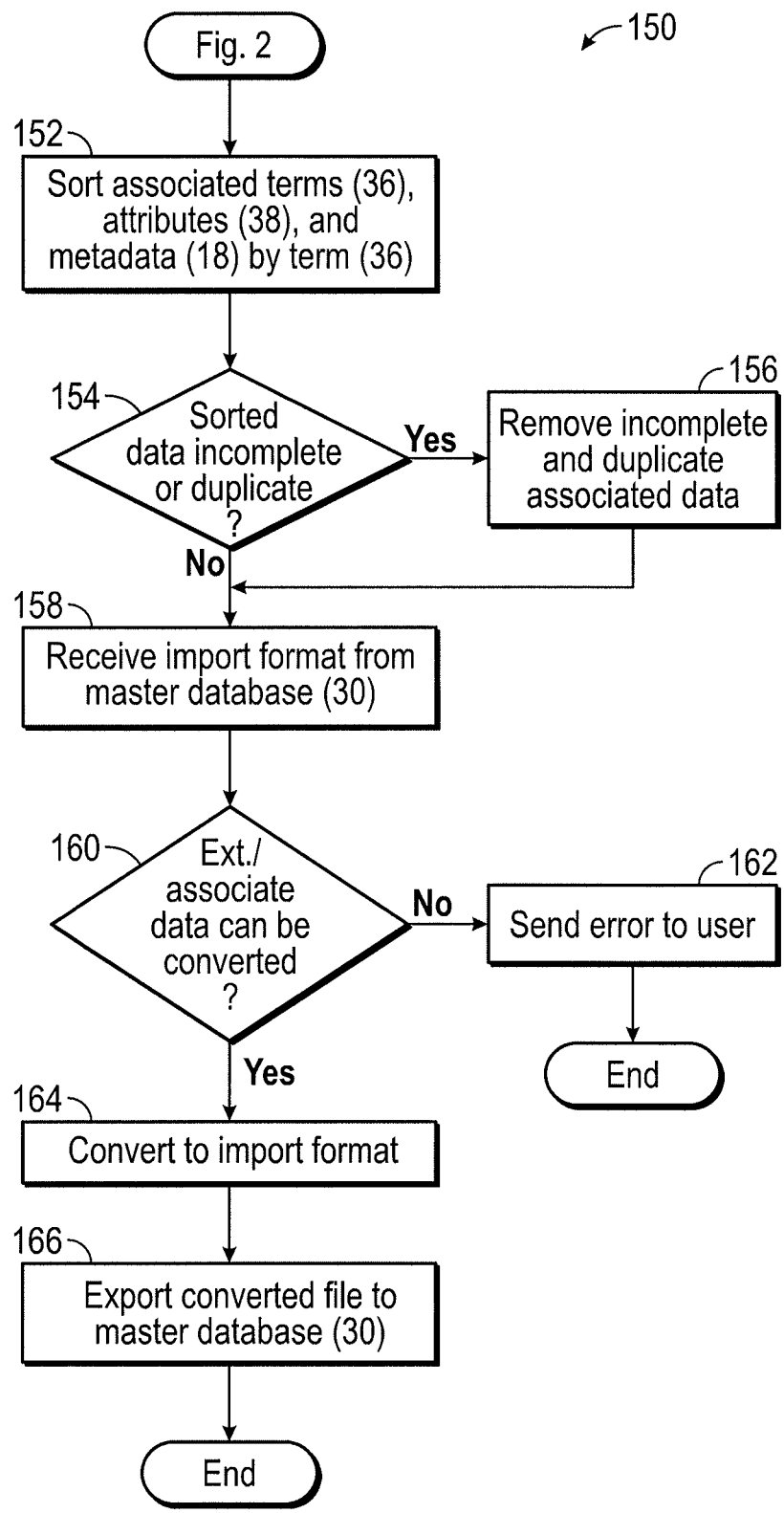
FIG. 3 illustrates a process executed by a transformation engine and export engine of the data structure migration control system.

Embodiments of the present disclosure are best understood by referring to FIGS. 1 through 3 of the drawings, like numerals being used for like and corresponding parts of the various drawings.

Computer systems and networks are used in industries and home environments. Increasingly, industries relying on these computer systems and networks are beginning to push up against the technical limitations of such systems. One technical challenge faced by modern day computer systems is managing metadata of files within memory structures. Generally, metadata is data about data. For example, metadata may include such information as the source of a file, the size of a file, the date a file was created, among other similar information. It is often useful and necessary for users and systems to have access to the metadata for a file. For example, regulators and end users may need to know an entire end-to-end dataflow of certain data to determine the original source and intermediate repositories that accessed the data before the data was stored in a final data structure such as a database.

Some data management structures store files where the data and metadata is included in the file. For example, these data management structures can store documents and charts that are provisioned by a user or another system. Some of these data management structures can also store the metadata accompanying these primary data files in a central data structure such as a database. However, data management structures are unable to receive data and metadata from other data management structures such as other databases and combine the data and metadata from those structures with the data and metadata already stored in the receiving data structure while preserving the relationships between the received data and its accompanying metadata.

One approach for overcoming this limitation in data management structures is presented in the present disclosure. In one embodiment of the present disclosure, a metadata management system with at least two databases is disclosed. This metadata management system operates in at least two stages. In the first stage, the first database receives data files and metadata associated with those files from several disparate file repositories. This data is all transformed into a common format and stored in the first database. This first database stores "terms" and "attributes" associated with the data files. In a non-limiting example, terms are file names or identifiers and attributes are specific traits of the files such as whether the files are confidential or proprietary, whether they have been flagged for follow-up or revision, whether they were generated in-house or by a third party, and other similar traits. The metadata is data about data, such as data about corresponding terms and attributes.

In the second stage, the disclosed system extracts the data along with terms and attributes associated with the data from the first database. Then, the system sorts and filters the extracted data to eliminate any incorrect or duplicative data.

In addition, the system links common terms and attributes from among the various file repositories with all of the corresponding metadata about those terms and attributes. The system then transforms the data and the metadata into a format that can be uploaded into a second master database while maintaining those links between terms, attributes, and metadata. For example, in one embodiment, the system may extract data in a .csv format and may transform the extracted data into a .xml format while retaining the linkage between the extracted terms, attributes, and metadata. Next, the system exports the transformed data and metadata to the second master database with all of the linkages remaining intact. In this manner, the master database is able to receive data and metadata from both primary data sources as well as secondary databases that already include data and metadata extracted from the primary data sources.

The present disclosure will be described in more detail using FIGS. 1 through 3. FIG. 1 illustrates one embodiment of an overall system for data structure migration control. FIG. 2 illustrates a process executed by an extraction engine of the data structure migration control. And FIG. 3 illustrates a process executed by a transformation engine and export engine of the data structure migration control. Although the figures illustrate specific processes using specific steps in specific orders, other embodiments may comprise other similar processes comprising the same or other similar steps in the same or other order without departing from the spirit of the disclosure.

FIG. 1 illustrates a system 10 comprising repositories 12a, 12b, and 12c that store data 16a, 16b, and 16c, and metadata 18a, 18b, and 18c. First database 22 receives data 16 and metadata 18 from repositories 12, via first network 20, and store corresponding files 34 that include terms 36, attributes 38, and a metadata sets 40, as described in greater detail below. Although data 16a-c may originally be in different formats, it can be transformed to a common format in conjunction with storing that data 16a-c in database 22. Processing engine 32 receives files 34 and metadata sets 40 from first database 22, processes the received files 34 and metadata sets 40, and transfers the processed data and metadata to master database 30. In one embodiment, database 22, processing engine 32 and database 30 all reside on the same physical server.

Repositories 12a, 12b, and 12c are programs, processes, databases, or other sources of information that generate or provision data 16a, 16b, and 16c, and metadata 18a, 18b, and 18c. Data 16 may comprise any suitable information including but not limited to employee information, revenue information, product information, among other similar information. Repositories 12 may be sources of data 16 internal to an enterprise, external third party sources or any combination of the two. For example, file repository 12a may provision data 16a from a department within a company whereas file repository 12b may provision data 16b collected over the Internet. File repositories 12 may provision any suitable type of data 16. For example, file repositories 12 may provision text data, code, data regarding time or date, numbers or any other suitable type of data.

Repositories 12a, 12b, and 12c may further provision metadata 18 associated with data 16. For example, repositories 12 may include metadata 18 including but not limited to information about the size of data 16, the source of data 16, the time and date that data 16 was last updated, among other similar information. Repositories 12 may further format the provisioned data 16 in any appropriate manner. For example, repositories 12 may provide date data in mm/dd/yyyy format or mmddyy format.

Workstations 14 comprise computer terminals from which a user may access data and metadata from database 30 via network 28.

Networks 20 and 28 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. Networks 20 and 28 may additionally include any combination of gateways, routers, hubs, switches, access points, base stations, wireless telephone systems and any other hardware, software or a combination thereof. Networks 20 and 28 may include any interconnecting system capable of transmitting audio, video, signals, data, messages, or any combination of the preceding between repositories 12, workstations 14, databases 22 and 30, processing engine 32, and any other portion of system 10. In various embodiments, networks 20 and 28 may be the same or may be different.

Databases 22 and 30 are any computer memory structures that comprise collections of data in schemas, tables, queries, reports, views, and/or other similar objects. Databases 22 and 30 may be of any suitable type including relational databases, object databases, XML databases, among others. In one embodiment, first database 22 stores data 16 received from first file repositories 12 in one or more files 34. Files 34 may further comprise terms 36 and attributes 38. Terms 36 are words or phrases that describe one or more aspects of data 16 or a file 34. Attributes 38 are qualities or features that characterize particular traits of data 16 or a file 34, such as whether the file 34 is confidential, proprietary, public, or undefined where each attribute may allow a predetermines set of users to access the file 34. For example, a confidential file 34 may only be accessible by a first set of users, a proprietary file may be accessible to a different set of users, and a public file 34 may be accessible by any users.

First database 22 may further comprise metadata set 40. Metadata set 40 may be the same as or different from metadata 18. Metadata set 40 may comprise such information as the source of data in file 34, the size of file 34, the date data in file 34 was created, and other information about file 34 and the terms 36 and attributes 28. First database 22 may store the data in files 34 in any suitable format. In one embodiment, data 16 is stored in a .csv format in database 22.

In one example embodiment, data 16a from repository 12a may represent an employee personnel file in the form of a spreadsheet that includes many columns and rows. Each of the names of those columns and rows may be considered a term 36. For example, one such term 36 may be "NAME" and may represent a column in the spreadsheet that includes information about the employee's name. In this example, one example of metadata 18a may be the size of the column associated with the term 36 called "NAME."

To continue the example, data 16b from repository 12b may represent a technical specification document that describes the architecture and design plan for an engineering project. The name of the author of that technical specification, the date it was created, the version of the document, etc. may each be considered a term 36. In this example, the term 36 "NAME" may also be used to identify the author. One example of metadata 18b associated with this term 36 may be the number of characters used to spell the name of the author of the technical specification.

Thus, in this example, the same term 36 called "NAME" may be used in both data 16a and data 16b. Each use of that term 36 has its own corresponding metadata 18a and 18b. As will be described in detail below, a linkage is created between the common term 36 called "NAME" and both of the corresponding pieces of metadata 18a and 18b. Once created, those linkages can be maintained in conjunction with a transformation of data 16 and metadata 18 from a first format (e.g., .csv) to a second format (e.g., .xml).

In some embodiments, master database 30 stores information processed by engine 32. Master database 30 may store the received information in any suitable manner including as a master file 42 and a master metadata set 54. These will be described in greater detail below.

Master database 30 may store data 16 in any suitable format. In one embodiment, data 16 may be imported into master database 30 in one or more specific formats. For example, in one embodiment of the present disclosure, data 16 may be imported into master database 30 in an .xml format. In other embodiments, data 16 may be imported into master database 30 in other suitable formats. Furthermore, in some embodiments, data 16 may be sorted and filtered before it is imported into master database 30. In other embodiments, master database 30 imports data 16 without any filtering or sorting. In some embodiments, master database 30 does not accept data 16 directly from database 22. For example, master database 30 may not be able to import data 16 in the format in which database 22 exports data 16. In such embodiments, processing engine 32 transforms the data 16 received from first database 22 and exports it to master database 30. This improves the functioning of any computer systems that access data 16 from master database 30, such as workstations 14, because those computer systems are able to access all relevant data 16 and metadata 18 in a suitable format and with all linkages between terms 36 and metadata 18 intact instead of having to collect data from a disparate set of sources including repositories 12 and first database 22, and then expend memory and processing resources to convert the collected data 16 into a compatible format.

In the illustrated embodiment, processing engine 32 is any module that comprises an interface 44, a processor 46 and a memory 48. Engine 32 may communicate with other aspects of system 10 via networks 20 and 28. Engine 32 receives information stored in first database 22, transforms that information into information that may be imported into master database 30, and exports the transformed data 16 and metadata 18 to master database 30 with all linkages between terms 36, attributes 38, and metadata 18 intact. FIGS. 2 and 3, described below, provide further detailed functionality performed by processing engine 32.

Interface 44 represents any port or connection, real or virtual, including any suitable hardware and/or software, including protocol conversion and data processing capabilities, to communicate through a LAN, WAN, or other communication system that allows controller 16 to exchange information with the other components of system 10. Interface 44 may communicate with processor 46 and memory 48.

Processor 46 may be any electronic circuitry, including, but not limited to microprocessors, application specific integrated circuits (ASIC), application specific instruction set processor (ASIP), and/or state machines, that communicatively couples interface 44 and memory 48 and controls the operation of controller 16. In some embodiments, processor 46 may be single core or multi-core having a single chip containing two or more processing devices. Processor 46 may be 8-bit, 16-bit, 32-bit, 64-bit or of any other suitable architecture. Processor 46 may comprise an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 46 may include other hardware and software that operates to control and process information. Processor 46 may execute computer-executable program instructions stored in memory 48. Processor 46 is not limited to a single processing device and may encompass multiple processing devices.

Memory 48 may include any one or a combination of volatile or non-volatile local or remote devices suitable for storing information. For example, memory 48 may include RAM, ROM, flash memory, magnetic storage devices, optical storage devices, network storage devices, cloud storage devices, solid state devices, or any other suitable information storage device or a combination of these devices. Memory 48 stores, either permanently or temporarily, data, operational software, other information for engine 32, database 22, or other components of system 10. For example, memory 48 may store user preferences or default settings for operating engine 32. Memory 48 may store information in one or more databases, file systems, tree structures, relational databases, any other suitable storage system, or any combination thereof. Furthermore, different information stored in memory 48 may use any of these storage systems. The information stored in memory 48 may be encrypted or unencrypted, compressed or uncompressed, and static or editable. Memory 48 may store information in one or more caches. In one embodiment, memory 48 stores extraction engine 50 and transformation engine 52.

Extraction engine 50 may be any computer program that is executed by processor 46 to extract files 34 comprising terms 36 and attributes 38 from first database 22. In one embodiment, extraction engine 50 extracts data 16, including terms 36 and attributes 38, from one or more files 34 stored in first database 22 in a first format. In one embodiment, extraction engine 50 extracts this information in a .csv format. In other embodiments, extraction engine 50 extracts this information in any other suitable format. Extraction engine 50 associates the extracted term 36 and attributes 38 with one or more pieces of metadata 18, as described above, to create appropriate linkages between them. Extraction engine 50 also associates a unique ID with the extracted data along with a date/time of extraction. In other embodiments, extraction engine 50 appends any other suitable information such as the size of the extracted data 16 and the date/time the extracted data 16 was last updated to the extracted information. Extraction engine 50 extracts data 16 and metadata 18 from database 22 based on any trigger, including a user input, a request from a third party, an automated trigger, or any other suitable prompting. One embodiment of an algorithm employed by extraction engine 50 is illustrated in FIG. 2 and discussed in greater detail below.

Transformation engine 52 may be any computer program that is executed by processing engine 32 to transform data 16 and metadata 18 that is extracted by extraction engine 50. In one embodiment, transformation engine 52 transforms the extracted data 16 from a first format into a second format so that the data 16 and metadata 18 may be imported into master database 30, with the linkages between terms 36, attributes 38, and metadata 18 remaining intact. For example, in one embodiment, transformation engine 52 may transform data 16 extracted by extraction engine 50 from a .csv format into a .xml format. In other embodiments, transformation engine 52 transforms the extracted information from any particular format into any other suitable format. In some embodiments, transformation engine 52 also sorts and filters the extracted information. For example, transformation engine 52 may sort the extracted information by terms 36 or attributes 38. Transformation engine 52 may also remove any data 16 with no associated terms 36 and attributes 38 as well as any duplicative entries from the extracted information. Transformation engine 52 also exports the transformed data 16 and metadata 18 to master database 30. One embodiment of an algorithm employed by transformation engine 52 is illustrated in FIG. 3 and discussed in greater detail below.

In operation, file repositories 12 provide data 16 and metadata 18 via network 20 to first database 22. First database 22 then aggregates and stores data 16 along with corresponding terms 36 and attributes 38 as well as metadata 18 in files 34. Extraction engine 50 then extracts data 16 and the corresponding terms 36 and attributes 38. Extraction engine 50 also extracts metadata 18 and associates it with extracted data 16. Extraction engine 50 creates linkages between common terms 36 and attributes 38 from among the various pieces of data 16 with the corresponding metadata 18 for each of those terms 36 and attributes 38. For example, a particular term 36 that is common to data 16a and data 16b is linked to the corresponding metadata 18a about that term 36 from data 16a as well as to the corresponding metadata 18b about that term 36 from data 16b. Similarly, a particular attribute 38 that is common to data 16a and data 16b is linked to the corresponding metadata 18a about that attribute 38 from data 16a as well as to the corresponding metadata 18b about that attribute 38 from data 16b. Extraction engine 50 extracts data 16 and metadata 18 in a first format. Next, transformation engine 52 transforms the extracted information from a first format into a second format, while maintaining the linkages between terms 36, attributes 38 and metadata 18 that were formed as described above. Transformation engine 52 also filters and sorts the extracted data 16 and metadata 18. Next, transformation engine 52 exports the transformed data 16 and metadata 18 to master database 30 with the linkages intact.

The disclosed system 10 improves the functioning of all downstream computer systems, such as workstations 14, that access data 16 and metadata 18. One particular technical improvement that results from the disclosed system 10 is that all downstream computers that need to access the data 16 in file repositories 12 and 14 are able to access and use such files in real-time, without the need to retrieve the data from disparate sources and in different, potentially incompatible formats. Another technical improvement is that any downstream computer systems are able to leverage the linkages between data 16 and metadata 18 throughout an enterprise. This allows the downstream computer systems to access data 16 and metadata 18 from a centralized repository and thereby save computing resources. This also allows the downstream computers to perform computing tasks that would otherwise have been impossible, such as the migration of data to and from sources of data that are not the original sources while maintaining linkages between terms 36, attributes 38, and metadata 18 intact. This allows downstream computers to handle large scale migrations of data 16 and metadata 18 that have tens to hundreds of thousands of linkages between them.

FIG. 2 illustrates a process 100 employed by extraction engine 50 to prepare data 16 and metadata 18 for transformation by transformation engine 52. As illustrated, at step 102, extraction engine 50 extracts data 16 from first database 22. Extraction engine 50 extracts data 16 by any suitable means including by prompting first database 22 to export or upload data 16. First database 22 may export or upload data 16 as flat files or as tables or objects or other similar data units. Next, at step 104, extraction engine 50 extracts terms 36 and attributes 38 from the extracted data 16. At step 106, extraction engine 50 associates the extracted terms 36 with the extracted attributes 38. Then, at step 106, extraction engine 50 determines if there are any terms 36 that do not correspond to an extracted attribute 38. If extraction engine 50 finds such terms, at step 108, extraction engine 50 removes those extracted terms 36 from the extracted data 16. Next, at step 110, extraction engine 50 determines if there are any attributes 38 that do not correspond to a term 36. Upon discovering such attributes 38, at step 112, extraction engine 50 removes the unassociated extracted attributes 38 from the extracted data 16. Next, at step 114, extraction engine 50 associates the remaining extracted terms 36 with extracted attributes 38.

At step 116, extraction engine 50 extracts metadata 18 from first database 22. At step 118, extraction engine 50 then associates the extracted metadata 18 with extracted terms 36 and attributes 38 to create the appropriate linkages between terms 36, attributes 38 and metadata 18, as described above. Further, at step 120, extraction engine 120 appends a date and time of extraction to the extracted and associated terms 36, attributes 38, and metadata 18. In some embodiments, extraction engine 50 appends the time in Greenwich Mean Time (GMT). The extracted data 16 and metadata 18 is then transmitted to transformation engine 52 as illustrated in FIG. 3 and explained in greater detail below.

FIG. 3 illustrates a process 150 employed by transformation engine 52 to transform extracted data 16, including terms 36 and attributes 38, and extracted metadata 18 from a first format to a second format. At step 152, transformation engine 52 receives the extracted data 16 and metadata 18 from extraction engine 50 in a first format, for example, in .csv format. Transformation engine 52 then sorts the received data 16 and metadata 18. For example, in the illustrated embodiment, transformation engine 52 sorts the extracted data 16 and metadata 18 by term 36. In other embodiments, transformation engine 52 may sort by attributes 38, by recency of data, by date last updated, or in any other suitable manner. Next, at step 154, transformation engine 52 filters data 16. To filter data 16, transformation engine 52 first determines at step 154 if any of the sorted data is incomplete or duplicative. If there is any incomplete or duplicated data, transformation engine 52 removes such data. For example, transformation engine 52 may search for any data that is missing a term 36, an attribute 38, or metadata 18 and filter out that data. Next, at step 158, transformation engine 52 receives an import format, such as, for example, from master database 30. This may be any suitable format including, for example .xml format. Then, at step 160, transformation engine 52 determines if the extracted and associated data from first database 22 can be converted to the import format of master database 30. If the extracted and associated data from first database 22 cannot be converted to the import format, then, at step 162, transformation engine 52 sends an error or other notification to a user or other system indicating the incompatibility and process 150 ends. If, at step 160, transformation engine 52 determines that the extracted and associated data can be converted into the import format, then, at step 164, transformation engine 52 converts the received extracted data 16 and metadata 18 into the import format, while keeping the linkages between terms 36, attributes 38 and metadata 18 intact. Next, at step 166, transformation engine 52 exports the converted data 16 and metadata 18 to master database 30 in the form of files 42 and metadata set 54.

The disclosed algorithms 100 and 150 improve the functioning of downstream computer systems. System 10 enables data 16 and metadata 18 stored in first database 22 to be moved to the master database 30 in a desired format with all the linkages between terms 36, attributes, 38 and metadata 18 remaining intact. Without the benefits of the disclosed system 10, a downstream computer system needing to access data 16 would have to expend processing power and network bandwidth to access disparate data repositories 12*a-c* with data 16 in different formats. The present system 10 resolves these technical challenges by centralizing and standardizing data from file repositories 12, and by creating linkages between terms 36, attributes 38 and metadata 18 in order to facilitate large scale migrations of data from source repository to intermediate repositories, among intermediate repositories, and from intermediate repositories to final repositories.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for data structure management, comprising:
a first database comprising:
   a first set of data and a corresponding first set of metadata in a first file format, wherein the first set of metadata comprises source information for the first set of data; and
   a second set of data and a corresponding second set of metadata in the first file format, wherein the second set of metadata comprises source information for the second set of data;
a master database, wherein:
   the master database is configured to receive data in a second file format; and
   the master database is unable to store data in the first file format; and
a processing engine, wherein:
   the processing engine is a device that is external from the first database and the master database; and
   the processing engine comprises:
      an interface operable to communicate with the first database and the master database; and
      a processor configured to:
         extract the first set of data and the first set of metadata from the first database in the first file format;
         identify a first plurality of terms from within the first set of extracted data;
         extract the second set of data and the second set of metadata from the first database in the first file format;
         identify a second plurality of terms from within the second set of extracted data;
         identify a first term from the first plurality of terms;
         identify a second term from the second plurality of terms that matches the first term;
         create a link between the first term and the second term, wherein the link connects source information associated with the first term with source information associated with the second term;
         transform the first set of data and the first set of metadata from the first file format into the second file format that is associated with the master database;
         transform the second set of data and the second set of metadata from the first file format into the second file format that is associated with the master database, wherein transforming the second set of data and the second set of metadata into the second file format maintains links between the first term and the second term, source information associated with the first term, and source information associated with the second term; and
         store the transformed data and metadata in the master database in the second file format with the link between the first term, the source information associated with the first term, and the source information associated with the second term remaining intact.

2. A method for data structure management, comprising:
extracting a first set of data and a first set of metadata from a first database in a first file format;
identifying a first plurality of terms from within the first set of extracted data;
extracting a second set of data and a second set of metadata from the first database in the first file format;
identifying a second plurality of terms from within the second set of extracted data;
identifying a first term from the first plurality of terms;
identifying a second term from the second plurality of terms that matches the first term;
creating a link between the first term and the second term, wherein the link connects source information associated with the first term with source information associated with the second term;
transforming the first set of data and the first set of metadata from the first file format into the second file format that is associated with the master database;
transforming the second set of data and the second set of metadata from the first file format into the second file format that is associated with the master database, wherein transforming the second set of data and the second set of metadata into the second file format maintains links between the first term and the second term, source information associated with the first term, and source information associated with the second term; and
storing the transformed data and metadata in a master database in the second file format with the link between the first term, the source information associated with the first term, and the source information associated with the second term intact, wherein the master database is unable to store data in the first file format.

3. A system for data structure management, comprising:
a first database comprising:
   a first file with a first plurality of term and a corresponding first set of metadata in a first file format, wherein the first set of metadata comprises source information for the first file, and a second file with a second plurality of terms and a corresponding second set of metadata in the first file format, wherein the second set of metadata comprises source information for the second file;

a master database, wherein:
  the master database is configured to receive data in a second file format; and
  the master database is unable to store data in the first file format;

a data structure management engine, wherein:
  the data structure management engine is a device that is external from the first database and the master database; and
  the data structure management engine comprises:
    an interface operable to communicate with the first database and the master database; and
    a processor configured to:
      extract the first file and the second file from the first database in the first file format;
      identify a first term from the first plurality of terms;
      identify a second term from the second plurality of terms that matches the first term;
      create a link between the first term and the second term, wherein the link connects source information associated with the first term with source information associated with the second term;
      transform the first set of data and the first set of metadata from the first file format into the second file format that is associated with the master database;
      transform the second set of data and the second set of metadata from the first file format into the second file format that is associated with the master database, wherein transforming the second set of data and the second set of metadata into the second file format maintains links between the first term and the second term, source information associated with the first term, and source information associated with the second term; and
      store the transformed first file and second file to the master database in the second file format with the link between the first term, the source information associated with the first term, and the source information associated with the second term intact.

4. The system of claim 1, wherein the first set of data further comprises a source column name identifying a column source for the first set of data in the first database.

5. The system of claim 1, wherein the extracted terms comprise text labels for the extracted first set of data.

6. The system of claim 1, wherein the first set of extracted data further comprises attributes.

7. The system of claim 1, wherein the first database receives the first set of data from a plurality of data sources in a plurality of file formats and the system is further operable to transform the first set of data received from the plurality of data sources into a common file format for storage in the first database.

8. The system of claim 1, wherein the first file format is a .csv format, and the second file format is an .xml format.

9. The method of claim 2, wherein the first set of data further comprises a source column name identifying a column source for the first set of data in the first database.

10. The method of claim 2, wherein the extracted terms comprise text labels for the extracted first set of data.

11. The method of claim 2, wherein the first set of extracted data further comprises attributes.

12. The method of claim 2, further comprising:
  receiving, at the first database, the first set of data from a plurality of data sources in a plurality of file formats; and
  transforming the first set of data received from the plurality of data sources into a common file format for storage in the first database.

13. The method of claim 2, wherein the first file format is a .csv format, and the second file format is an .xml format.

14. The system of claim 3, wherein the first term comprises a file name, the first metadata comprises a size of the file name, and the second metadata comprises a language of the file name.

15. The system of claim 3, wherein the first file originated from a first file repository and the second file originated from a second file repository in different formats.

16. The system of claim 3, wherein the first file further comprises an attribute.

17. The system of claim 16, wherein the attribute designates whether the first file is confidential, proprietary, public, or undefined.

18. The system of claim 3, wherein the first database stores the first file and the second file in a common file format.

* * * * *